United States Patent
Watanabe et al.

(10) Patent No.: US 6,748,151 B1
(45) Date of Patent: Jun. 8, 2004

(54) OPTICAL FIBER ATTENUATOR WITH ATTENUATING DOPANT LIMITED TO A CENTRAL OR PERIPHERAL AREA OF THE FIBER CORE

(75) Inventors: Masaru Watanabe, Kawasaki (JP); Eiji Matsuyama, Kawasaki (JP); Akiyoshi Naruse, Kawasaki (JP); Yuichi Murakami, Kawasaki (JP); Kenichi Muta, Kawasaki (JP); Toyomitsu Yamamoto, Kawasaki (JP)

(73) Assignee: Showa Electric Wire & Cable Co., Ltd. (JP)

( * ) Notice: Subject to any disclaimer, the term of this patent is extended or adjusted under 35 U.S.C. 154(b) by 0 days.

(21) Appl. No.: 09/868,766

(22) PCT Filed: Oct. 18, 2000

(86) PCT No.: PCT/JP00/07230
§ 371 (c)(1),
(2), (4) Date: Jun. 21, 2001

(87) PCT Pub. No.: WO01/31372
PCT Pub. Date: May 3, 2001

(30) Foreign Application Priority Data

Oct. 22, 1999  (JP) ............................................. 11-300608

(51) Int. Cl.$^7$ ................................ G02B 6/18; G02B 6/16
(52) U.S. Cl. .................... 385/124; 385/125; 385/140
(58) Field of Search ............................... 385/123–128, 385/140

(56) References Cited

U.S. PATENT DOCUMENTS

| | | | | |
|---|---|---|---|---|
| 3,843,229 A | * | 10/1974 | Rosenberger | 385/124 |
| 5,013,131 A | * | 5/1991 | Fotheringham | 385/124 |
| 5,570,448 A | * | 10/1996 | Imoto et al. | 385/123 |
| 5,841,926 A | * | 11/1998 | Takeuchi et al. | 385/123 |
| 5,892,876 A | * | 4/1999 | Desurvire et al. | 385/123 |
| 6,055,353 A | * | 4/2000 | Aiso | 385/123 |
| 6,134,366 A | * | 10/2000 | Loeb et al. | 385/123 |
| 6,151,438 A | * | 11/2000 | Espindola et al. | 385/10 |
| 6,321,016 B1 | * | 11/2001 | Tirloni et al. | 385/123 |
| 6,498,888 B1 | * | 12/2002 | Chenard et al. | 385/127 |

FOREIGN PATENT DOCUMENTS

| | | | | |
|---|---|---|---|---|
| JP | 10339822 A | * | 12/1998 | G02B/6/22 |
| JP | 11264908 A | * | 9/1999 | G02B/6/00 |

\* cited by examiner

*Primary Examiner*—John D. Lee
(74) *Attorney, Agent, or Firm*—Lorusso, Loud & Kelly

(57) ABSTRACT

An optical attenuator which provides almost the same degree of attenuation even when the difference in wavelength of two different kinds of input optical signals is small. Another optical attenuator is provided with a dopant concentration in a technically realizable range which increases the difference in optical attenuation of two different kinds of input optical signals. Almost the same degree of attenuation may be obtained even when the difference between wavelengths is small by canceling the wavelength dependency of attenuation of the dopant by raising the refractive index of an axially central portion of the core as compared to that of the peripheral portion of the core and by taking into account the type and area of the dopant and the ratio of the difference $\Delta 2$ between the refractive indexes of the cladding and the axial portion of the core and the difference $\Delta 1$ between the refractive index of the cladding and the refractive index of the peripheral portion, i.e., $\Delta 1/\Delta 2$. On the other hand, the difference of attenuation is increased while suppressing the concentration of dopant to the realizable range.

9 Claims, 7 Drawing Sheets

(a)

(b)

US 6,748,151 B1

OPTICAL FIBER ATTENUATOR WITH ATTENUATING DOPANT LIMITED TO A CENTRAL OR PERIPHERAL AREA OF THE FIBER CORE

TECHNICAL FIELD

The present invention relates to an optical attenuator and more specifically to an optical attenuator used for attenuating optical signals in the fields of optical communications, optical measurements, CATV systems and the like.

BACKGROUND OF THE INVENTION

Optical attenuators comprising an optical fiber containing an optical attenuating dopant have been widely known. However, the dopant contained in these generally known optical attenuators has a transmitted light attenuating characteristic where the attenuation varies depending on the wavelength of the optical signal, i.e., it has a wavelength dependency. There is also known an optical attenuator in which the wavelength dependency is reduced by adjusting the mode field diameter of the optical fiber and by limiting the dopant area with respect to the mode field diameter in order to obtain almost equal attenuation of input optical signals of different wavelengths, e.g., 1.3 $\mu$m (short wavelength) and 1.5 $\mu$m (long wavelength) (Japanese Laid-Open ("Kokai") Nos. Hei. 8-136736 and Hei. 8-136737).

Recent diversification of optical communications, has created a demand for an optical attenuator having equal optical attenuation (eliminating the wavelength dependency) even in a narrow wavelength range of 1300 mm±50 nm or 1550±50 nm, for example or an optical attenuator whose wavelength dependency in optical attenuation is increased for optical signals of, for example, two different wavelengths of 1.3 $\mu$m (short wavelength) and 1.5 $\mu$m (long wavelength).

However, although the optical attenuators disclosed in Japanese Laid-Open ("Kokai") Nos. Hei. 8-136736 and Hei. 8-136737 are effective because they give almost equal attenuation of optical signals of two different wavelengths of 1.3 $\mu$m (short wavelength) and 1.5 $\mu$m (long wavelength), they have the problem that they are unable to provide equal optical attenuation (wavelength dependency is large) merely by limiting the dopant area or by adjusting the mode field diameter when the difference of the wavelengths is small.

When the optical signals of two different wavelengths of (short and long) wavelengths are input, it is theoretically possible to increase the wavelength dependency of the optical attenuation by using a dopant which gives greater attenuation of the short wavelength optical signals, with high concentration close to the axial core when the mode field is seen as a transverse section of the optical fiber or by using a dopant which gives greater attenuation of longwave optical signals with higher concentration close to the outer periphery of the optical fiber when the mode field is seen as a transverse section of the optical fiber (Japanese Laid-Open ("Kokai") No. Hei. 8-136736).

It is also theoretically possible to realize the equality (Japanese Laid-Open ("Kokai") No. Hei. 8-136737) by reversing the combination of the wavelength characteristics of the mode field diameter and the wavelength characteristics of the dopant.

However, although the difference between the short wavelength and the long wavelength attenuation is increased by raising the dopant concentration and by limiting the doping area to a narrow range with respect to the mode field diameter, there has been a difficult problem that, because the doping concentration of the dopant which can be contained in the optical fiber is limited, it is not possible to create an optical fiber product having characteristics which are stable when the concentration is too high and it is not technologically possible to create optical fiber products whose doping area is very narrow.

SUMMARY OF THE INVENTION

The present invention has been devised in view of the above-described problems and has as its object, firstly, to provide an optical attenuator which can equalize optical attenuation of optical signals having different wavelengths which are very close and, secondly, to provide an optical attenuator which can maximize the difference of optical attenuation of the optical signals having different wavelengths in an optical fiber with stable characteristics and wherein the dopant concentration and doping area range may be realized with a relatively low dopant concentration.

In order to achieve the above-mentioned objects, the present invention provides a single mode optical fiber, as an inventive optical attenuator, having a core with a refractive index of a center portion greater than that of a peripheral portion.

The wavelength dependency of the attenuation of transmitted light caused by the size of the mode field diameter is increased by adopting, as a distribution of the refractive index of the core, a distribution gradient selected from the group consisting of a gradient wherein the refractive index rises continuously from the peripheral portion to the center portion ("graded-index type"), a parabolic shaped gradient, a triangular wave shaped gradient, a square wave shaped gradient and a trapezoidal wave shaped gradient.

By constructing the optical attenuator as described above, it is possible to widen the limited width of the dopant area for obtaining the required attenuating characteristics as much as possible and to minimize the dopant concentration.

In one embodiment the optical attenuator contains dopant which provides greater attenuation of longer wave length transmitted light in a signal mode optical fiber and is constructed so that the dopant area is limited to the center part of the core and so that the refractive index at the center part of the core is greater than that of the peripheral part of the core. The wavelength dependency of the attenuation of transmitted light caused by the size of the mode field diameter is increased by adopting, as the distribution of refractive index of the dopant area, a gradient selected from the group consisting of a gradient wherein the refractive index rises continuously from the peripheral portion to the center portion ("graded-index type"), a parabolic shaped gradient, a triangular wave shaped gradient, a square wave shaped gradient and a trapezoidal wave shaped gradient. By constructing the optical attenuator in this manner, it is possible to obtain equal attenuation of two input optical signals having different wavelengths which are short and whose difference is small (1300 nm±50 nm).

In another embodiment the optical attenuator is a signal mode optical fiber containing dopant which provides greater attenuation of shorter wavelength transmitted light and constructed so that the dopant area is limited to the peripheral part of the core and so that the refractive index at the center part of the core containing no dopant is greater than that of the peripheral part of the core. In this embodiment also, the wavelength dependency of the attenuation of transmitted light caused by the size of the mode field diameter is increased by adopting a refractive index gradient selected from the group consisting of a gradient wherein the refractive index rises continuously from the peripheral portion to the center portion, a parabolic shaped gradient, a triangular wave shaped gradient, a square wave shaped gradient and a trapezoidal wave shaped gradient, as the refractive index profile at the center part of the core where no dopant is contained. By constructing the optical attenuator in this manner, it is possible to obtain equal attenuation of two kinds of input optical signals having different long wavelengths whose difference is small (1550 nm±50 nm). In still another embodiment an optical attenuator is a signal mode optical fiber containing a dopant which preferentially attenuates shorter wavelength transmitted light and is constructed so that the dopant area is limited to the center part of the core and so that the refractive index at the center part of the core containing dopant is greater than that of the peripheral part of the core. In this case, the wavelength dependency of the attenuation of transmitted light caused by the size of the mode field diameter is increased by adopting a refractive index profile selected from the group consisting of a gradient wherein the refractive index rises continuously from the peripheral portion to the center portion, a parabolic shaped gradient, a triangular wave shaped gradient, a square wave shaped gradient and a trapezoidal wave shaped gradient. By constructing the optical attenuator in the above manner, it is possible to obtain optical signals of two different wavelengths whose difference in attenuation of transmitted light caused by the difference of the wavelengths is maximized.

Another embodiment provides an optical attenuator in the form of a signal mode optical fiber containing dopant which gives greater attenuation of longer wavelength transmitted light and constructed so that the dopant area is limited to the peripheral part of the core. A gradient wherein the refractive index rises continuously from the peripheral portion to the center portion ("graded-index type") is adopted as the refractive index profile of the dopant area to increase the wavelength dependency of attenuation of transmitted light caused by the size of the mode field diameter.

In yet another embodiment an optical attenuator is constructed as a single mode optical fiber having a refractive index at the center part of the core greater than that of the peripheral part of the core due to incorporation of a dopant whose transmitted light attenuating characteristics depend on the wavelength of optical signal input to the optical fiber. The dopant concentration of the dopant area of the single mode optical fiber is distributed non-uniformly to provide a mode field which substantially contributes to the transmission of optical signals in the radial direction, i.e., transverse of the optical fiber. In this case, the wavelength dependency of the attenuation of transmitted light caused by the size of the mode field diameter is increased by adopting, as the distribution of refractive index of the dopant area, a gradient selected from the group consisting of a gradient wherein the refractive index rises continuously from the peripheral portion to the center portion, a parabolic shaped gradient, a triangular wave shaped gradient, a square wave shaped gradient and a trapezoidal wave shaped gradient. By constructing the optical attenuator in this manner, it is possible to obtain the required attenuating characteristics even when the dopant area is small and the dopant concentration is low.

Figure 1:
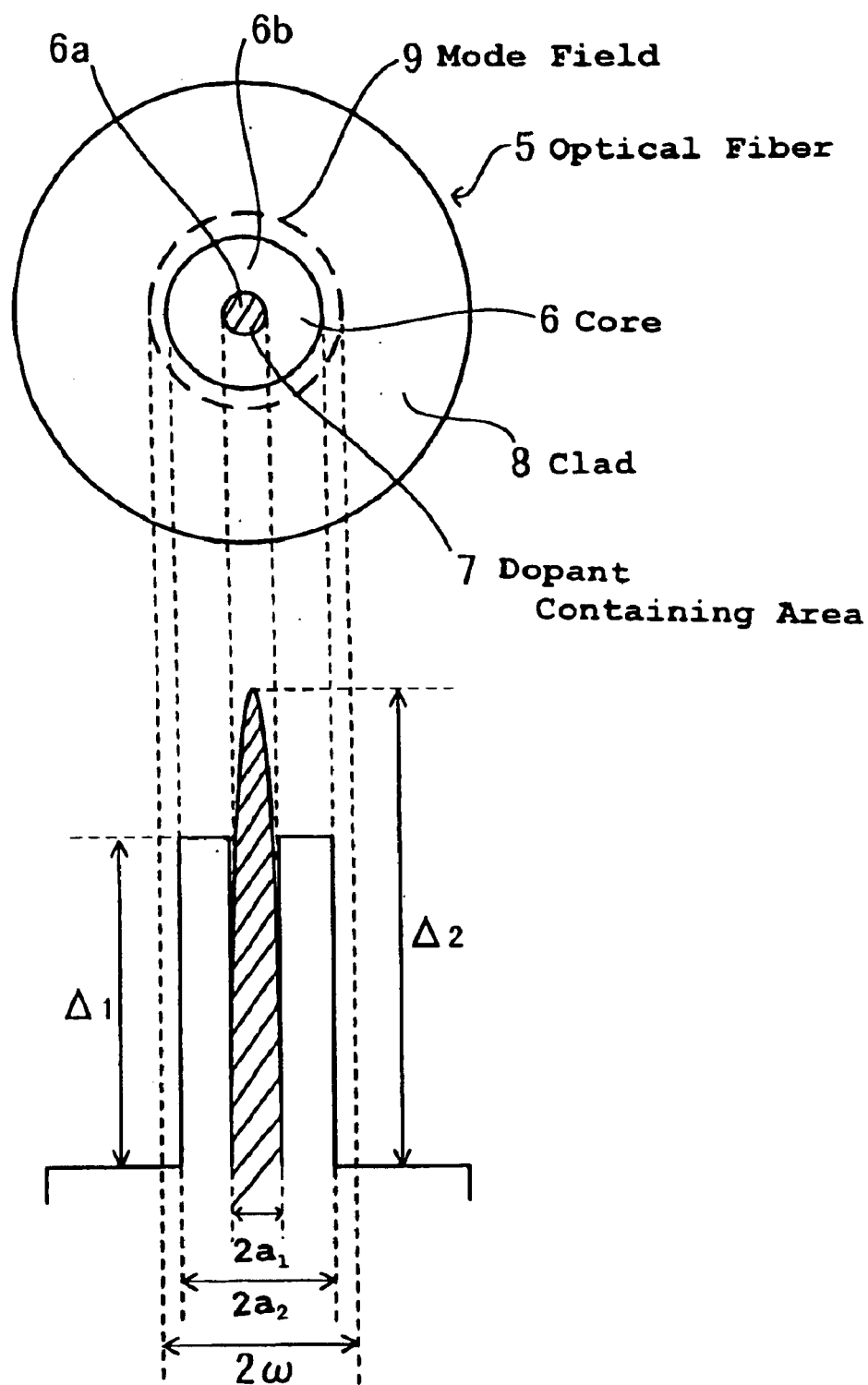
FIG. 1 shows the structure of one embodiment of an optical attenuator according to the present invention, wherein the upper part of the figure shows an end face of the optical attenuator and the lower part shows a refractive index profile thereof.

BRIEF DESCRIPTION OF REFERENCE NUMERALS 5, 5' Single Mode Optical Fiber
6, 6' Core
6a, 6a' Center portion of Core
(Portion close to the core axis)
6b, 6b' Outer Periphery portion of Core
(Portion close to the outer periphery of core)
7, 7' Dopant Area
9, 9' Mode Field

DESCRIPTION OF THE PREFERRED EMBODIMENTS

Preferred embodiments of an inventive optical attenuator will be explained below with reference to the drawings.

Figure 2:
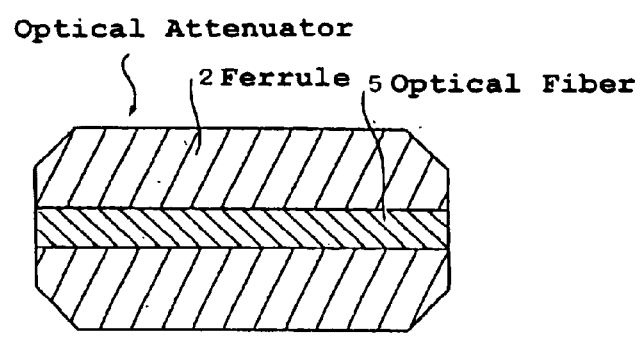
FIG. 2 shows the optical attenuator of the present invention disposed at the center of a ferrule.

FIG. 1 is a section view showing the structure of an optical fiber 5 which is used by disposition at the center of a ferrule 2 as shown in FIG. 2, for example. That is, in use it receives an optical signal at one end thereof and it outputs the signal from the other end after attenuating the optical signal by a certain degree. To this end a dopant for attenuating the optical signal is incorporated into the optical fiber 5.

In this embodiment, a graded-index type (its refractive index increases continuously from the outer peripheral part to the center part) is adopted as a refractive index profile at the center portion 6a close to the axis of the core 6 and a high concentration of dopant is contained within this area 7. The dopant area 7 is hatched in the figure.

Because a core diameter $2a_2$ is very small in the single mode fiber, energy of the optical signal propagates centering on the core 6 while actually overflowing to a portion of the cladding 8 at the outer periphery of the core 6. The range in which the larger portion of the energy is contained is a mode field 9 portion which contributes substantially to the transmission of the optical signals and may be found qualitatively by using Equation 1, as explained later for both the step-index type fiber and the graded-index type fiber. In the optical fiber 5 shown in FIG. 1, the diameter of the mode field 9 is denoted as $2o$, the diameter of the dopant area 7 as $2a_1$ and the diameter of the core 6 as $2a_2$. The difference between the maximum refractive index around the axial portion of the core 6 and the refractive index of the cladding is denoted as $\Delta 2$ and the difference between the maximum refractive index of the outer peripheral portion 6b of the core 6 and the refractive index of the cladding 8 as $\Delta 1$.

Figure 3:
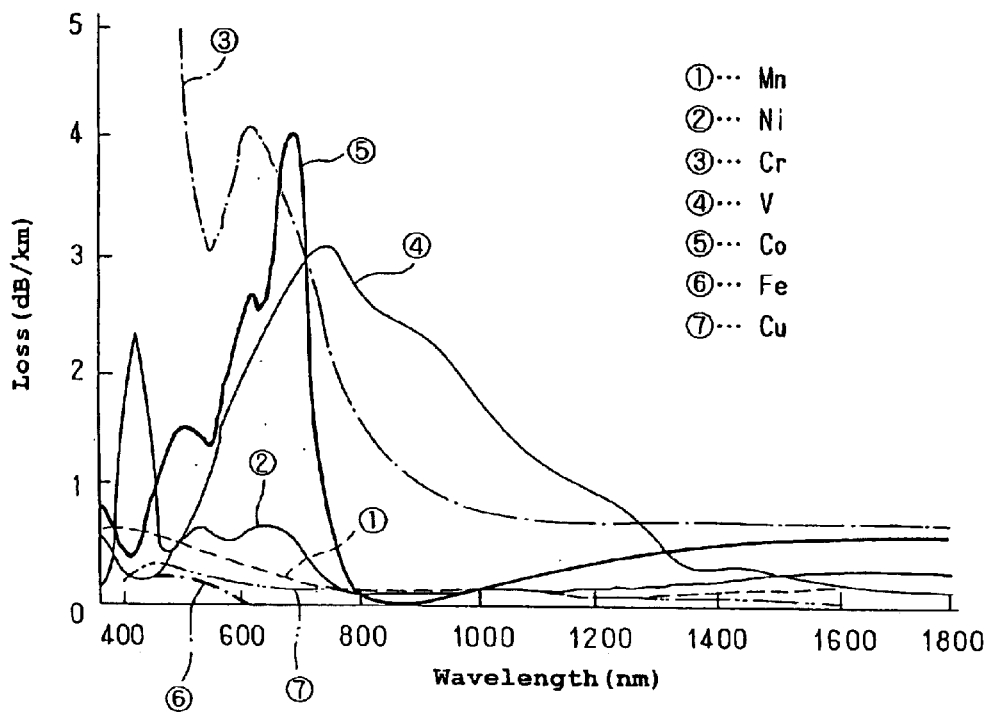
FIGS. 3a and 3b are graphs showing the relationship between wavelength and loss using various dopants.
Figure 3:
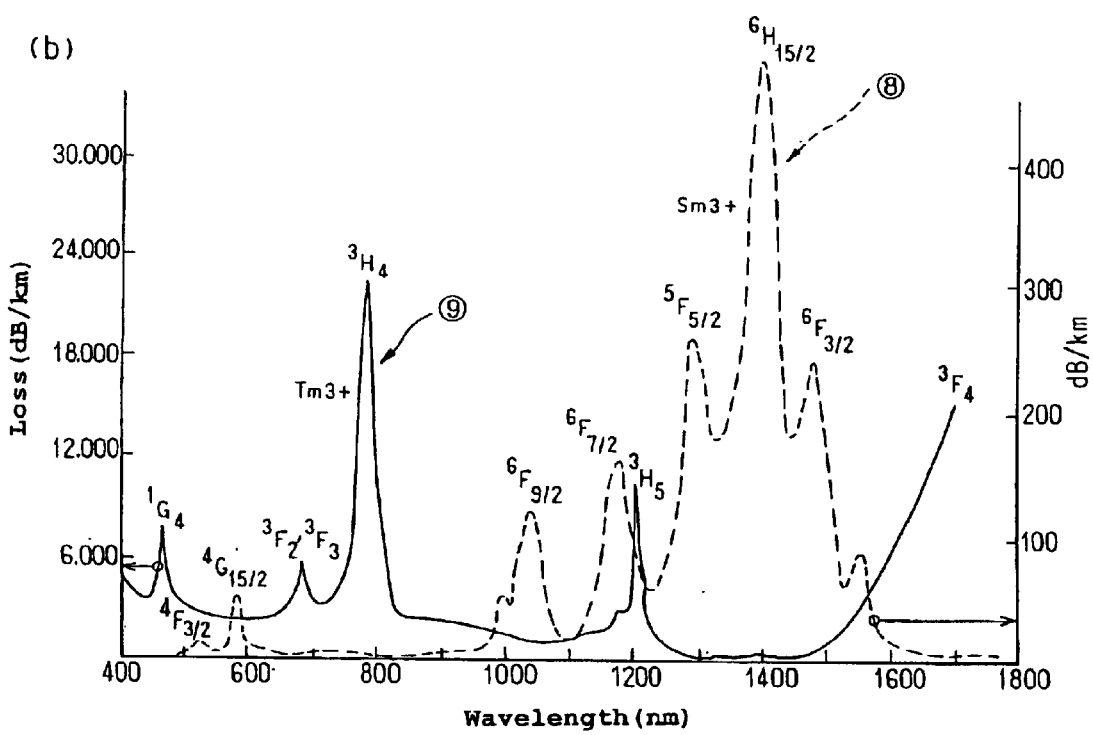

Use of dopants in the optical fiber 5 to attenuate the optical signals will now be explained. FIGS. 3a and 3b are graphs showing the relationship between wavelength and loss for various dopants. The horizontal axis of the graph represents the wavelength in nanometers (nm) and the vertical axis represents the optical attenuation in (dB/km). A transition metal or rare-earth metal dopant is normally used for optical fibers used in communications. They may be used singly or in combinations of two or more. In FIG. 3a, (1) denotes the characteristics of manganese (Mn), (2) nickel (Ni), (3) chrome (Cr), (4) vanadium V, (5) cobalt (Co), (6) iron (Fe), and (7) copper (Cu). In FIG. 3b, (8) represents the characteristics of samarium (Sm) and (9) thulium (Tm).

The first embodiment of the optical attenuator of the present invention uses a dopant which attenuates more transmitted light when the wavelength of the optical signal is longer. When the wavelength to be used in this optical attenuator is around 1.5 pm to 1.6 pm for example, as can be seen from FIG. 3a, cobalt (Co) is suitable as the dopant.

Figure 4:
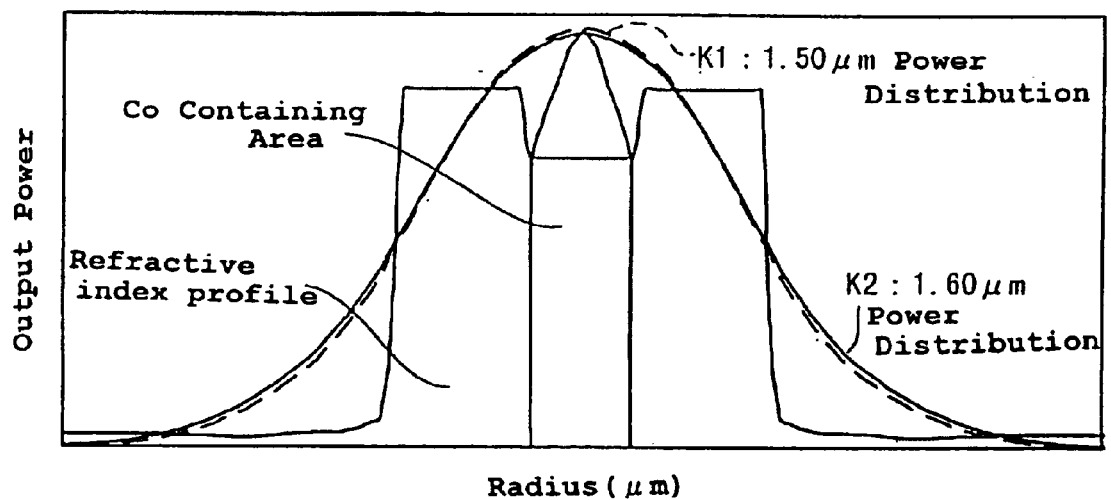
FIG. 4 is a graph showing the optical signal power distribution within the optical attenuator of the present invention.

FIG. 4 shows the optical signal power distribution when cobalt (Co) is used as the dopant and the dopant is contained in the area as shown in FIG. 1. The vertical axis of FIG. 4 represents the output power and the horizontal axis represents the position in the fiber in the radial direction. K1 in FIG. 4 is power distribution in the radial direction when an optical signal a wavelength of 1.5 $\mu$m is transmitted through the optical fiber. A curve K2 represents the power distribution of an optical signal of 1.6 $\mu$m.

Table 1 shows the difference of mode field diameter (hereinafter referred to as "MFD") corresponding to the respective wavelengths $\lambda 1$ and $\lambda 2$ in each fiber when the respective wavelengths $\lambda 1=1.50$ $\mu$m and $\lambda 2=1.60$ $\mu$m are inputted to the fiber having the structure of the first embodiment as shown in FIG. 4 and to the normal step index type fiber.

TABLE 1

|  | Difference ($\mu$m) of mode field diameter of 1.50 $\mu$m and 1.60 $\mu$m |
| --- | --- |
| First Embodiment | 0.52 |
| Step index | 0.25 |

This shows that the difference of MFD of the fiber caused by the difference of wavelengths is large (wavelength dependency is large).

When cobalt (Co) is concentrated in the axial portion of the core, the longer the wavelength of a signal, the less the portion of the whole signal energy influenced by the attenuation becomes. This means that the wavelength dependency of the optical attenuation of the dopant is cancelled. As a result, the optical signals of short and long wavelengths, whose difference of wavelength is small, attenuate to the same degree in this attenuator as a whole.

In the case of the conventional step index type fiber, the concentration of dopant is high and causes a serious production problem when designed so as to show the same degree of attenuation as the first embodiment described above, because the dopant area of cobalt (Co) must be narrowed because the wavelength dependency of the optical attenuation of the MFD is small.

A concrete example using Equations 1 and 2 is given below. Equation 1 is used for calculation of attenuation $\alpha$ of the optical fiber and Equation 2 is used for calculation of the mode field diameter $\omega$.

---

Expression 1

Attenuation a $$\alpha = \frac{\int \alpha_{Co} A(r) P(r) r \, dr}{\int P(r) r \, dr} \quad \text{Equation 1}$$

a: attenuation per 1 cm
r: coordinate of fiber in radial direction
A(r): concentration of Co in radial direction
$\alpha$Co: coefficient of absorbency of Co
$\lambda = 1.50$ $\mu$m $\rightarrow$ $5.19 \times 10^{-3}$ dB/cm · ppm$^{-1}$
$\lambda = 1.60$ $\mu$m $\rightarrow$ $5.95 \times 10^{-3}$ dB/cm · ppm$^{-1}$
P(r): optical power distribution in radial direction Mode Field Diameter $\omega$ $$2\omega = 2 \left[ \frac{2 \int P^2(r) r^3 \, dr}{\int P^2(r) r \, dr} \right]^{1/2} \quad \text{Equation 2}$$

P(r): optical power distribution in radial direction
r: coordinate of fiber in radial direction

---

As shown in Equation (1), the attenuation a of the optical signal in the optical fiber may be found from the power distribution P(r) of the optical signal in the radial direction and the distribution of concentration of cobalt, i.e., the dopant. The mode field diameter $\omega$ may be found from Equation (2).

The ratio (a1/a2) of the area in which the graded-index type is adopted as the profile containing cobalt (Co) to the core diameter approaches the step index type when it is too large or too small and the wavelength dependency of the mode field diameter $\omega$ approaches the step index type. When the ratio (a1/a2) is small, although the wavelength dependency of the attenuation a becomes small because the dopant area of cobalt (Co) becomes small, even when the wavelength dependency of the mode field diameter $\omega$ is small, there have been problems such as an increase of the amount of cobalt dopant and an increase of processing steps. Here, the result of using a1/a2=0.5 is shown.

Figure 5:
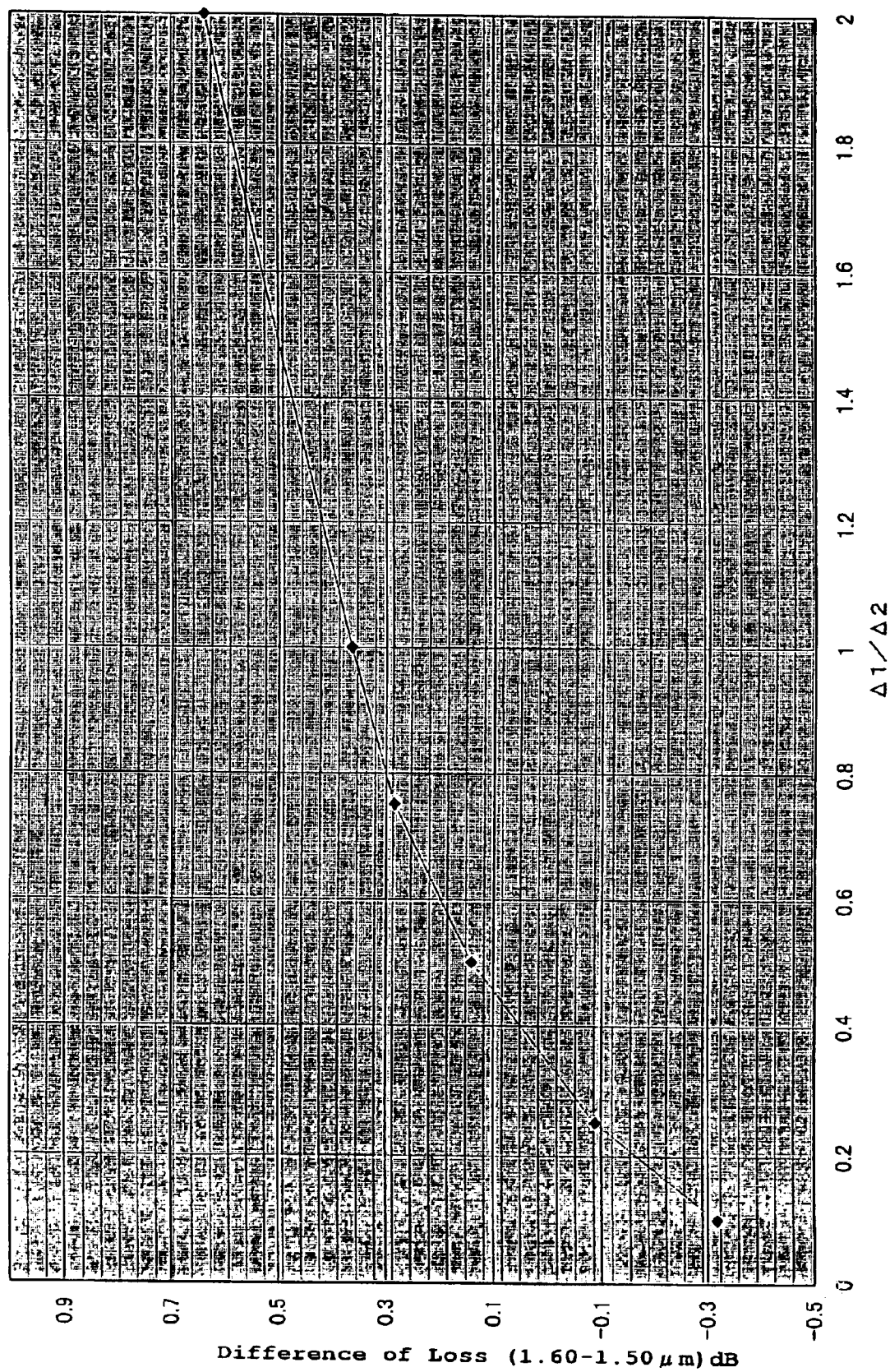
FIG. 5 is a graph showing the relationship between the ratio of difference of refractive index $\Delta 1/\Delta 2$, where $\Delta 1$ is the difference between the maximum refractive index of an axial center portion of the core and the refractive index in the cladding of the optical attenuator and $\Delta 2$ is the difference between the maximum refractive index in the outer peripheral portion of the core and the refractive index of the cladding, and the difference of loss at 1.50 $\mu$m and 1.60 $\mu$m.

FIG. 5 is a graph representing the ratio of difference of refractive index $\Delta 1/\Delta 2$ (horizontal axis) and the difference of loss (attenuation) at 1.50 $\mu$m and 1.60 $\mu$m when the attenuation at 1.55 $\mu$m is 10 dB (vertical axis). It can be seen from FIG. 5 that the greater the ratio $\Delta 1/\Delta 2$, the wider the difference of the attenuation at 1.50 $\mu$m and 1.60 $\mu$m becomes. The wavelength dependency of attenuation of the dopant maybe canceled by this value.

Table 2 shows the structural characteristics of the fiber with $\Delta 1/\Delta 2=0.75$, whose wavelength dependency is small, as shown in FIG. 5. $\Delta 1/\Delta 2$ is not 0.35 because it represents a practical fiber structure in which bending loss and others are taken into account.

Figure 6:
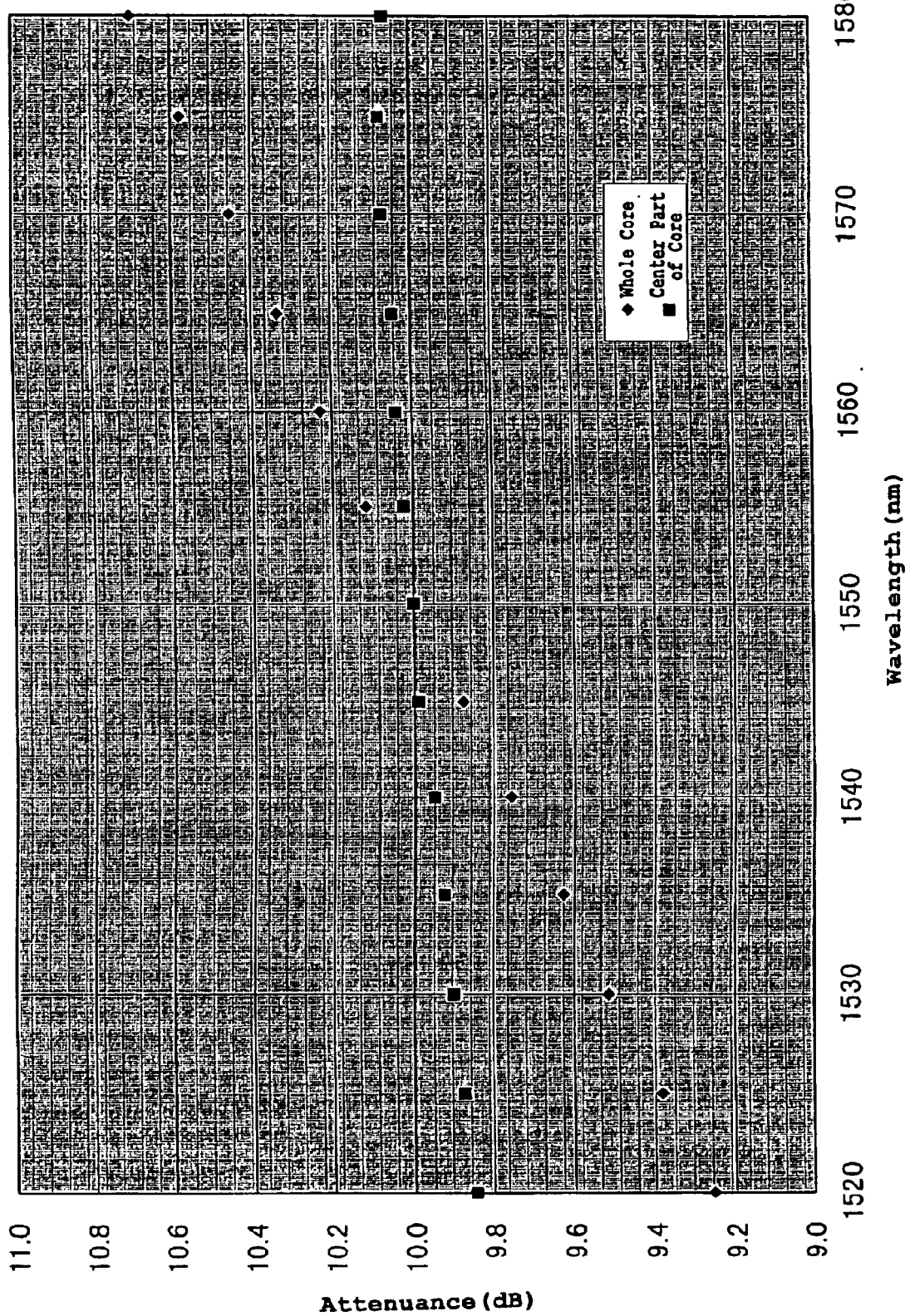
FIG. 6 is a graph showing the attenuation with respect to wavelength when cobalt (Co) is doped in the center portion of the core of the optical attenuator.

FIG. 6 is a graph showing the attenuation with respect to the wavelength of the fiber in Table 2. The wavelength dependency is lessened by cobalt dopant in the center portion of the core of the optical attenuator and by adopting the graded-index type as the profile.

TABLE 2

|  | Core Diameter | a1/a2 | Δ1/ Δ2 | MFD (1.50 μm) | MFD (1.60 μm) |
|---|---|---|---|---|---|
| Embodiment | 7.4 μm | 0.5 | 0.5 | 9.15 | 9.67 |
| Step-Index | 9.5 μm | 0.5 | 0.5 | 9.26 | 9.51 |

This sample has been set so that the whole distribution of concentration of cobalt becomes fixed within the range in which cobalt (Co) is contained. The attenuation of the optical fiber has been set to 10 dB/m. As a result, $\Delta1/\Delta2=$ 0.35 and the wavelength dependency was eliminated when a1/a2=0.5. A wavelength independent optical attenuator may be obtained by increasing $\Delta1/\Delta2$ when a1/a2 becomes large and by decreasing $\Delta1/\Delta2$ when a1/a2 becomes small.

The dopant which attenuates transmitted light more when the wavelength of the optical signal is longer is used in the center portion 6a of the core 6 of the optical fiber 5 in the first embodiment described above. In the alternative, dopant which attenuates transmitted light more when the wavelength of the optical signal is shorter may be used by changing the area where the dopant is doped. For instance, vanadium (V) of (4) and the like are shown in the example of FIG. 3a.

Figure 7:
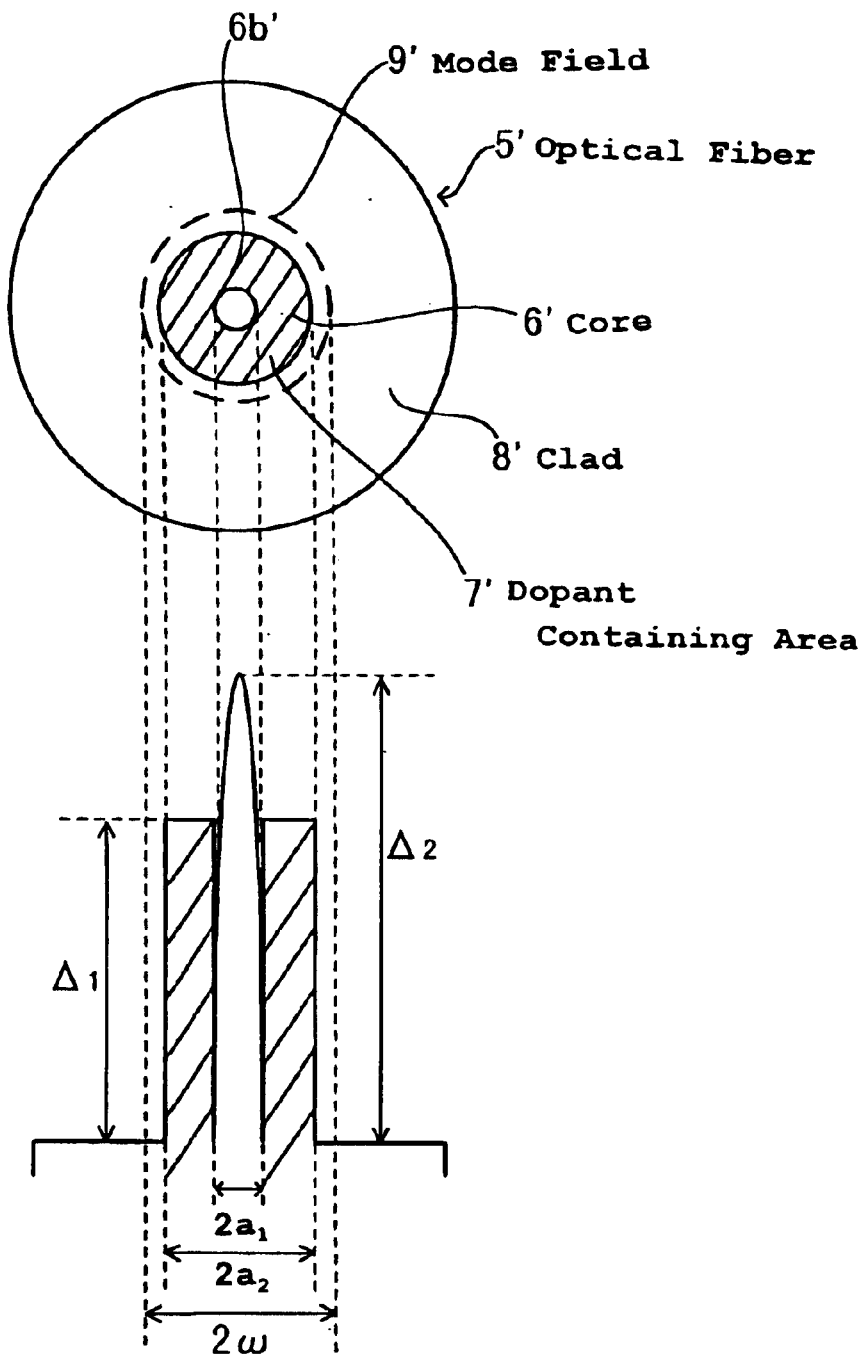
FIG. 7 shows the structure of another embodiment of the optical attenuator of the present invention, wherein the upper part of the figure shows an end face of the optical attenuator and the lower part shows the refractive index profile.

FIG. 7 shows a second embodiment of the inventive optical attenuator using a dopant which attenuates transmitted light more when the wavelength of the optical signal is shorter. In the second embodiment, a dopant-containing area 7' is created which preferentially attenuates shorter wavelength transmitted light more in a peripheral portion 6b of core 6' in which the refractive index profile is set as the graded-index type. In this case, the longer the wavelength of the optical signal whose power distribution extends in the radial direction of the optical fiber 5', the more it is influenced by the dopant.

Thus, the optical attenuation of the optical signal of wavelength within a certain range may be almost equalized by increasing the wavelength dependency of the mode fields 9 and 9', which substantially contribute to the transmission of optical signal of the single mode optical fiber, by controlling the refractive index profile, by selection of the distribution of concentration of dopant within the transverse section of the cores 6 and 6' of the optical fibers 5 and 5' and by using a dopant whose transmitted light attenuating characteristics depend on the wavelength of the optical signal. It is noted that although the dopant is doped only to the axial portion 6a of the core 6 or in the peripheral portion 6b of the core 6 in the embodiments described above, it is possible to appropriately distribute concentration. Also, it is not necessary to obtain uniform characteristics for all wavelengths of optical signals and it is possible to set a concentration range so that a certain attenuation may be obtained for optical signals of several ranges.

The first and second embodiments provide almost the same attenuation to one having the small difference of wavelengths of optical signals of two different kinds of wavelengths to be inputted.

In a third embodiment of the optical attenuator of the present invention, the refractive index profile around the axial portion of the core of the single mode fiber is the same as that of the first and second embodiments described above. However, the third embodiment is different in that the wavelength dependency of the MFD is increased by use of a dopant which attenuates transmitted light when the wavelength is short, e.g., samarium (Sm) shown by (8) in FIG. 3b, in the axial portion of the core and by adjusting the ratio between the diameter of the axially central portion of the core where the refractive index is set as the graded-index type and the core diameter.

Figure 8:
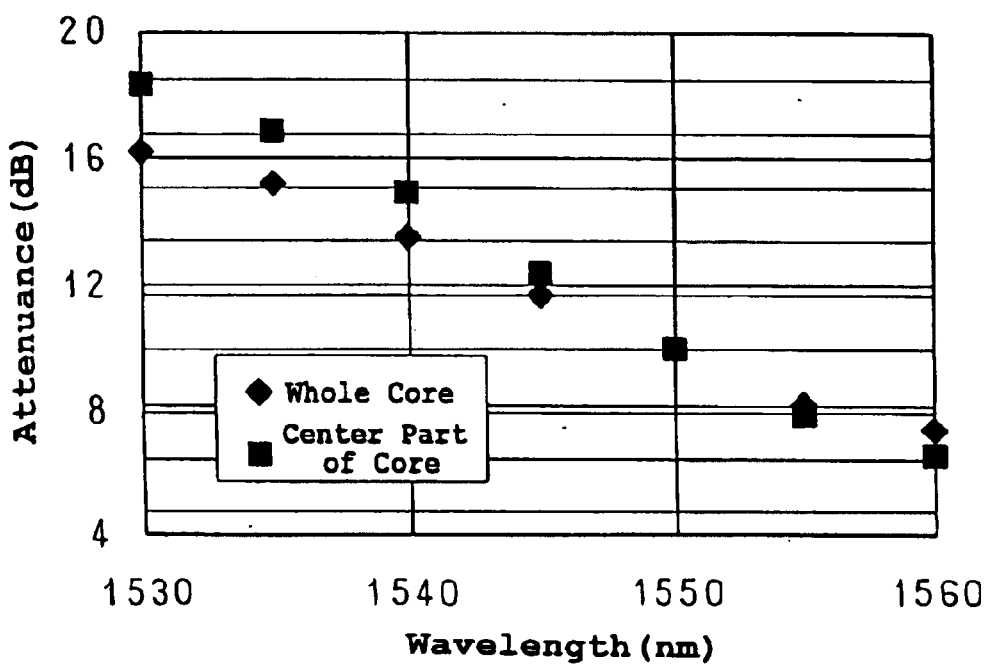
FIG. 8 is a graph showing the attenuation with respect to wavelength when samarium Sm is doped in the whole core and samarium Sm is doped only in an axial portion of the core.

FIG. 8 is a graph showing the attenuation with respect to wavelength when samarium (Sm) is doped in the whole core and when samarium (Sm) is doped only in the axially central portion of the core. It can be seen from the graph that the attenuation is greater when samarium is doped only in the axial portion of the core, i.e., between 1530 nm to 1550 nm.

The shorter the wavelength, the greater the optical signal is attenuated when two kinds of optical signals having different wavelengths are inputted. Further, a greater attenuation may be obtained without reducing the center core diameter more than required and without increasing the dopant concentration.

Accordingly, this third embodiment is very effective in increasing the difference of attenuation of those two kinds of optical signals having different wavelengths.

In a fourth embodiment of the invention the refractive index profile around the axial core of the core of the single mode fiber is the same as those of the first and second embodiments described above. However, this forth embodiment is different in that the wavelength dependency of the MFD is increased by use of a dopant which attenuates transmitted light more when its wavelength is longer, e.g., cobalt (Co), in the portion of the core surrounding the axial center portion where the refractive index profile is set as the graded-index type and by adjusting the ratio of the diameter of the portion having a refractive index of the graded-index type (axial center portion) and the core diameter.

Figure 9:
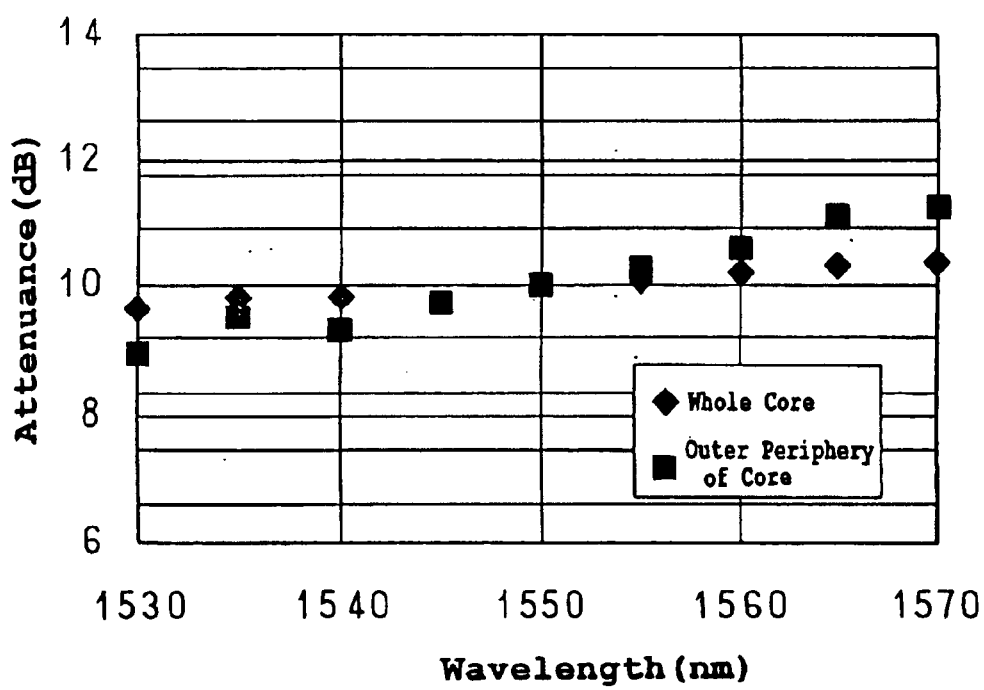
FIG. 9 is a graph showing the attenuation with respect to wavelength when cobalt (Co) is doped in the whole core and cobalt (Co) is doped only in the outer peripheral of the core.

FIG. 9 is a graph showing the attenuation relative to wavelength when cobalt (Co) is doped throughout the whole core and when cobalt (Co) is doped only in an outer peripheral portion of the core. It can be seen from the figure that the attenuation wherein Co is doped only in the outer peripheral portion of the core is greater between 1560 nm to 1570 nm.

The longer the wavelength, the greater the optical signal is attenuated when two kinds of optical signals having different wavelengths are input. Further, a greater attenuation may be obtained without increasing the dopant concentration more than required.

Accordingly, this fourth embodiment is very effective in increasing the difference in attenuation of the two kinds of optical signals having different wavelengths.

As it is apparent from the above description, according to the present invention, it is possible to fix the optical attenuation for optical signals having different wavelengths which are very close with a practical doping range in which the dopant concentration is relatively low.

Further, according to the present invention, it is possible to increase the difference in optical attenuation as much as possible with a practical dopant concentration and a doping area range in which each characteristic of the optical fiber is stabilized for optical signals having different wavelengths.

In particular, it is possible to equalize the attenuation of different wavelengths by increasing the wavelength dependency of the MFD by adjusting the ratio of the axially inner core diameter to the core diameter by increasing the refractive index around the axially inner core portion relative to the peripheral portion of the core and by use of a dopant which attenuates signals having longer wavelength, for example, with a higher concentration within the inner core portion in which the refractive index is increased relative to the peripheral portion of the core to cancel the attenuation wavelength dependency of the dopant.

Further, the present invention provides an effective means of equalizing the attenuation of optical signals having a small difference in wavelength by use of a dopant which preferentially attenuates short wavelengths, at a higher concentration within the core portion (axially center portion) in which the refractive index is increased relative to the peripheral portion of the core.

Further, it is possible to increase the difference in attenuation due to the difference of wavelengths by increasing the wavelength dependency of the MFD by adjusting the ratio of the diameter of the axially inner portion of the core wherein the refractive index is increased relative to the peripheral portion of the core and the core diameter, by using a dopant which preferentially attenuates shorter wavelengths with a higher concentration within the axial central portion of the core wherein the refractive index is increased relative to the peripheral portion of the core and by increasing the wavelength dependency of attenuation of the dopant member.

Moreover, the present invention provides a very effective means for realizing an increase of attenuation of optical signals with different wavelengths, with minimal reduction of the MFD and minimal increase in the dopant concentration, by use of a dopant which preferentially attenuates longer wavelength optical signals, doped within the core wherein the refractive index is increased relative to the peripheral part of the core.

What is claimed is:

1. An optical attenuator in the form of a single mode optical fiber for receiving an optical signal, attenuating the optical signal and outputting the attenuated optical signal, said optical attenuator comprising a core containing a dopant which attenuates the optical signal more when its wavelength is longer, said dopant being contained only in a dopant area limited to a centermost portion of said core, said core comprising said centermost portion and a peripheral portion contiguous with said centermost portion and free of dopant, said core having a refractive index at said centermost portion greater than that of said peripheral portion, said optical fiber having a mode field for single mode transmission of the optical signal inclusive of said centermost and peripheral portions of said core.

2. The optical attenuator as claimed in claim 1, having a distribution of refractive index of said dopant area in the form of a gradient selected from the group consisting of a graded-index type, parabolic shapes, triangular wave shapes, square wave shapes and trapezoidal wave shapes.

3. The optical attenuator as claimed in claim 1, further comprising cladding on and surrounding said core, said cladding not containing dopant.

4. An optical attenuator in the form of a single mode optical fiber for receiving an optical signal, attenuating the optical signal and outputting the attenuated optical signal, said optical attenuator comprising a core containing a dopant which attenuates the optical signal more when its wavelength is shorter, said dopant being contained only in a dopant area limited to a peripheral portion of said core, said core comprising a centermost portion free of dopant and said peripheral portion contiguous with said centermost portion, said core having a refractive index at said centermost portion greater than that of said peripheral portion, said optical fiber having a mode field for single mode transmission of the optical signal inclusive of said centermost and peripheral portions of said core.

5. The optical attenuator as claimed in claim 4, wherein the refractive index has a profile selected from the group consisting of a graded-index type, parabolic shapes, triangular wave shapes, square wave shapes and trapezoidal wave shapes.

6. The optical attenuator as claimed in claim 4, further comprising cladding on and surrounding said core, said cladding not containing dopant.

7. An optical attenuator in the form of a single mode optical fiber for receiving an optical signal, attenuating the optical signal and outputting the attenuated optical signals, said optical attenuator comprising a core containing a dopant which attenuates the optical signal more when its wavelength is longer, said dopant being contained only in a dopant area limited to a peripheral portion of said core, said core comprising a centermost portion free of dopant and said peripheral portion contiguous with said centermost portion, said core having a refractive index at said centermost portion greater than that of said peripheral portion, said optical fiber having a mode field for single mode transmission of the optical signal inclusive of said centermost and peripheral portions of said core.

8. The optical attenuator as claimed in claim 7, wherein the refractive index has a profile selected from the group consisting of a graded-index type, parabolic shapes, triangular wave shapes, square wave shapes and trapezoidal wave shapes.

9. The optical attenuator as claimed in claim 7, further comprising cladding on and surrounding said core, said cladding not containing dopant.

* * * * *

UNITED STATES PATENT AND TRADEMARK OFFICE
CERTIFICATE OF CORRECTION

PATENT NO.   : 6,748,151 B1
DATED        : June 8, 2004
INVENTOR(S)  : Watanabe et al.

It is certified that error appears in the above-identified patent and that said Letters Patent is hereby corrected as shown below:

Column 3,
Line 11, begin new paragraph after "(1550 nm+-50 nm)." and before "In still".

Column 6,
Line 46, delete "a" in "attentuation a becomes" and replace with -- α --.

Column 10,
Line 29, "signals" should read -- signal --.
Please insert the following as claims 10, 11 and 12:

-- 23. An optical attenuator in the form of a single mode optical fiber for receiving optical signals having wavelengths within a predetermined range of wavelengths, attenuating a received optical signal and outputting the attenuated optical signal, said optical attenuator comprising a core containing a dopant which attenuates the received optical signal more when its wavelength is shorter within the predetermined range of wavelengths, said dopant being contained only in a dopant area limited to a centermost portion of said core, said core comprising said centermost portion and a peripheral portion contiguous with said centermost portion and free of dopant, said core having a refractive index at said centermost portion greater than that of said peripheral portion, said optical fiber having a mode field for single mode transmission of the optical signal inclusive of said centermost and peripheral portions of said core.

24. The optical attenuator as claimed in claim 23, wherein the refractive index has a profile selected from the group consisting of a graded-index type, parabolic shapes, triangular wave shapes, square wave shapes and trapezoidal wave shapes.

25. The optical attenuator as claimed in claim 23, further comprising cladding on and surrounding said core, said cladding not containing dopant. --

Signed and Sealed this

Twenty-third Day of November, 2004

JON W. DUDAS
*Director of the United States Patent and Trademark Office*